United States Patent

[11] 3,581,596

| [72] | Inventor | George E. Wespi<br>Holden, Mass. |
| --- | --- | --- |
| [21] | Appl. No. | 819,882 |
| [22] | Filed | Apr. 28, 1969 |
| [45] | Patented | June 1, 1971 |
| [73] | Assignee | Norton Company<br>Worcester, Mass. |

[54] BALANCING APPARATUS FOR A ROTATING ELEMENT
7 Claims, 2 Drawing Figs.

| [52] | U.S. Cl. | 74/573,<br>51/169 |
| --- | --- | --- |
| [51] | Int. Cl. | F16f 15/22 |
| [50] | Field of Search | 74/573;<br>51/169; 73/458 |

[56] References Cited
UNITED STATES PATENTS

| 3,407,545 | 10/1968 | Imiolczyk | 74/573X |
| --- | --- | --- | --- |
| 3,468,189 | 9/1969 | Gosche | 74/573 |

Primary Examiner—Fred C. Mattern, Jr.
Assistant Examiner—F. D. Shoemaker
Attorney—Lewis M. SMith, Jr.

ABSTRACT: A primary housing mounted for rotation with a given rotating element and rotatably supporting a secondary housing externally maintained nonrotating, the primary housing enclosing and rotatably supporting first and second eccentrically weighted balancing members normally maintained in fixed angular relation to the given rotating element, and the secondary housing rotatably supporting first and second externally accessible control members each selectively independently operable to change the normally fixed angular relationship between one of the balancing members and the given rotating element within a 360° range of adjustment as required to balance the given rotating element.

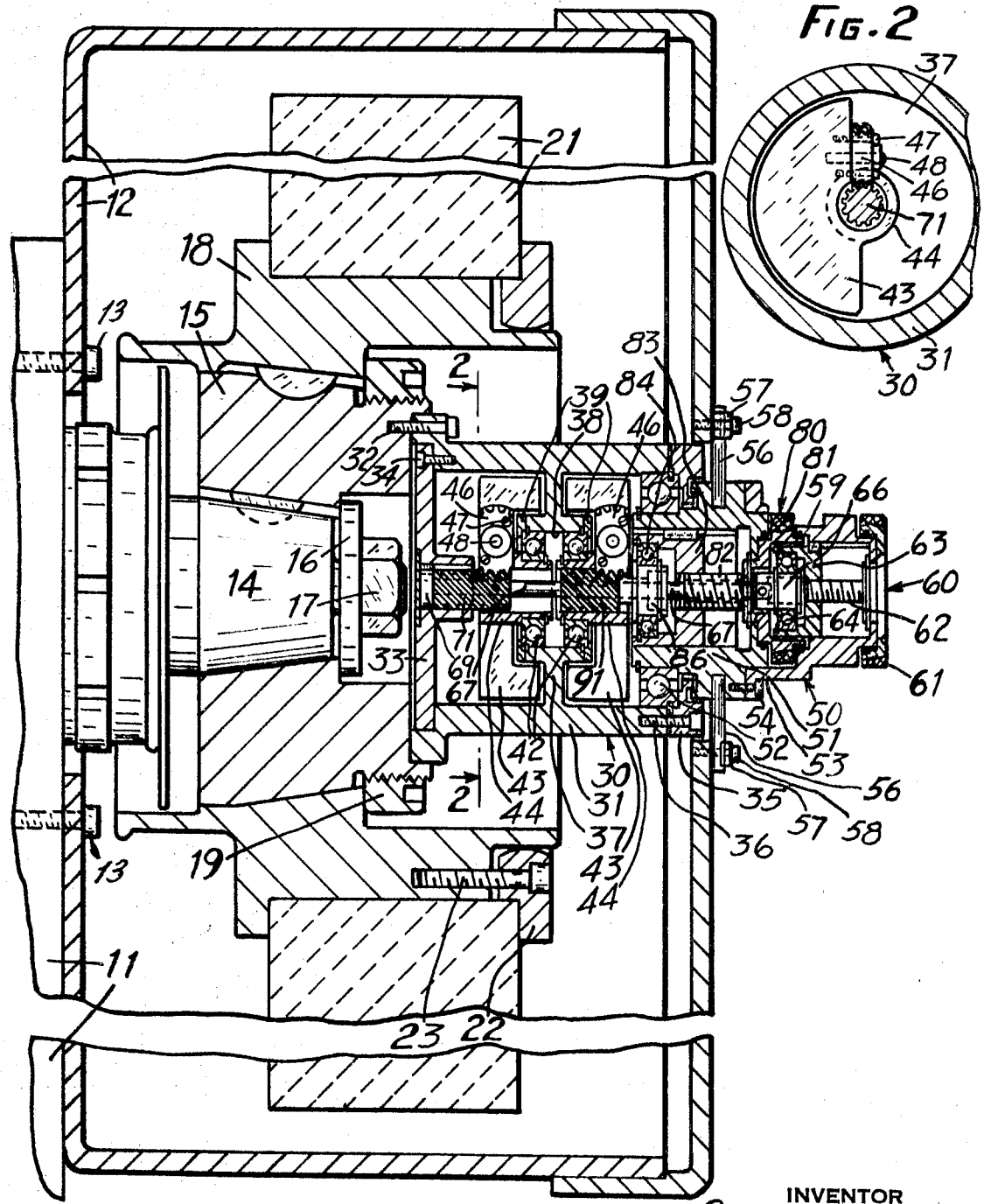

BALANCING APPARATUS FOR A ROTATING ELEMENT

BACKGROUND OF THE INVENTION

Recurrent requirements for precisely balanced rotating elements useful in various different applications have fostered the development of various different means of balancing such rotating elements ranging in complexity and in their ease of operation from the attachment by trial and error of one or more eccentrically located weights to a rotatable element while it is at rest, to relatively complex balancing apparatus permanently incorporated in a spindle assembly supporting a grinding wheel or other rotating element subject to recurrent unbalanced conditions in normal use and selectively operable automatically to balance such a rotating element, as described in U.S. Pat. No. 3,107,550, and further capable of being cycled automatically in response to a signal indicating the development of an unbalanced condition, as described in U.S. Pat. No. 3,107,459. Between these extremes, there have been developed numerous balancing devices arranged to be mounted in fixed relation to and rotatable with a grinding wheel or other rotating element, and yet be manually operable to adjust included balancing weights while such an element is rotating.

The balancing devices described in U.S. Pat. Nos. 2,164,900 and 2,241,637 are exemplary of the type of balancing devices last referred to above in which a pair of eccentrically weighted balancing members supported for rotation with a grinding wheel are manipulated by a pair of manually operable controls to achieve a balanced condition of the grinding wheel as indicated by observation of a vibration indicator which may be mounted on the structure supporting or enclosing the grinding wheel so as to detect vibration caused by an unbalanced rotating grinding wheel.

More particularly, U.S. Pat. No. 2,164,900 discloses a pair of balancing weights supported eccentrically of the axis of rotation of the grinding wheel selectively adjustable either collectively with a fixed intervening angle by manual displacement of a first push-pull knob, or relatively to change their intervening angle by manual displacement of a second push-pull knob.

Similarly, U.S. Pat. No. 2,241,637 discloses a pair of eccentrically weighted discs mounted for displacement about the axis of rotation and selectively adjustable either collectively with a fixed intervening angle or relatively to vary the intervening angle between their respective eccentrically weighted portions by manipulation of a first control lever, the nature of the adjustment in each case depending upon the setting of a clutch assembly operated by manipulation of a second control lever.

SUMMARY OF THE INVENTION

The balancing apparatus of the instant invention, suitable for use with various different kinds of rotating elements including rotary tools, is particularly suited to use with a relatively wide range of sizes of grinding wheels, all commonly subject to a substantial reduction in size and weight during normal usage, with a consequent requirement for repeated balancing operations, preferably to be completed quickly and efficiently with the associated grinding wheel rotating at its normal speed.

In order to be useful for the widest possible range of grinding wheel sizes, a given unit of this balancing apparatus must be small enough to fit within the limited space available at the center of a relatively small grinding wheel, and yet incorporate balancing weights of such configuration they are effective to overcome the much larger amount of unbalance which may occur in a relatively large grinding wheel.

Accordingly, the balancing device of the instant invention features a housing of relatively small diameter enclosing first and second balancing members, each having an eccentric weighted portion located adjacent the inner surface of the housing and each rotatable relative to an associated grinding wheel, and first and second control means accessible externally of the housing and respectively operable independently through first and second actuating means to rotate the first and second balancing members as required to balance an associated grinding wheel while it is rotating.

BRIEF DESCRIPTION OF THE DRAWINGS

FIG. 1 is a vertical section taken on the axis of rotation of the balancing device incorporating the instant invention, shown in operative relation to a grinding wheel mounted for rotation with a supporting spindle assembly, and FIG. 2 is a vertical section taken on line 2-2 of FIG. 1 showing details of the camming mechanism for a balancing member incorporated in the balancing mechanism illustrated in FIG. 1.

DESCRIPTION OF THE PREFERRED EMBODIMENT

Referring now to the drawings wherein like reference numerals refer to like or corresponding parts, and particularly to FIG. 1, this view illustrates a portion of a typical grinding machine comprising a wheel support or slide 11 fixedly supporting a wheel guard assembly 12 secured thereto by any suitable attachment means such as screws 13 and rotatably supporting a typical wheel spindle assembly including a taper 14 engaged by a wheel hub 15, secured to the wheel spindle assembly by a retaining ring 16 and a locking nut 17, and in turn supporting a wheel flange 18 secured by a threaded locking ring 19.

Referring further to FIG. 1, the grinding wheel 21 is mounted fixedly upon wheel flange 18 and secured by locking ring 22 attached to the wheel flange 18 by screws 23. The wheel balancing mechanism including the primary housing therefor generally designated by the reference numeral 30 may be mounted concentrically of and fixedly for rotation with the grinding wheel 21 by any suitable means such as the arrangement illustrated in FIG. 1 wherein a flange at the inner end of the annular cylindrical portion 31 of the primary housing 30 is secured to the wheel hub 15 by attachment screws 32. The primary housing 30 also includes an inner end plate 33 secured to cylindrical portion 31 by suitable attachment means such as screws 34, an outer end ring 35 secured to cylindrical portion 31 by any suitable attachment means such as screws 36, and a centrally located internal flange 37 supporting a concentric cylindrical bearing support 38 and first and second bearing retainer rings 39 in turn supporting first and second antifriction bearing assemblies 42.

Referring again to FIG. 1, the primary housing 30 rotatably supports first and second eccentrically weighted balancing members 43, each including a relatively light annular supporting portion or sleeve 44 rotatably supported by one of the bearing assemblies 42 and a single relatively heavy peripheral weighted portion, preferably extending along up to half of the inner circumference of the cylindrical portion 31 as indicated in FIG. 2, and a radially extending web interconnecting the annular supporting portion and the weighted portion. Each balancing member 43 also includes or fixedly supports a toothed cam follower 46, which may be a segment of a worm gear, fixedly secured to the associated balancing member 43 by screws 47 and a locating pin 48, as illustrated, or by other suitable attachment means. See also FIG. 2 for a further showing of the innermost balancing member 43 and an additional view of the cam follower 46.

Again referring to FIG. 1, the secondary housing generally designated by the reference numeral 50 includes an innermost first annular generally cylindrical portion 51, and an outermost second annular generally cylindrical portion 53, the former being rotatably supported within the annular cylindrical portion 31 by antifriction bearing assembly 52 and secured within primary housing 30 by the outer end ring 35, and the latter being fixedly secured to the former by screws 54.

In order to simplify the showing in the drawings, FIG. 1 shows one of a pair of diametrically opposed openings 59 through portion 53 of the secondary housing 50 located 90° from its actual location, openings 59 having been provided for access to knob 81 from outside secondary housing 50.

The secondary housing 50 is maintained nonrotating by radially disposed restraining pins 56, secured by clamps 57 and screws 58 engaging wheel guard assembly 12, or by any other suitable restraining means.

Referring still to FIG. 1, a first manual control assembly generally designated by the reference numeral 60 includes a knurled knob 61 rotatably mounted upon and externally of the outermost portion 53 of the secondary housing 50, and fixedly supporting concentric thereof and coaxially with an associated grinding wheel a threaded drive screw 62 threadably engaging an annular collar 63 keyed to and slidable within the secondary housing 50 and supporting an antifriction bearing assembly 64 in turn rotatably supporting a bell shaped coupling 66 pinned or otherwise fixedly connected to an elongated cam driving rod 67 with an enlarged head 69, the rod 67 and a first helical cam 71 fixedly secured thereto being slidable, but nonrotatable relative to the primary housing 30.

A second manual control assembly generally designated by the reference numeral 80 includes a knurled knob 81 mounted rotatably up on and accessible externally of the secondary housing 50 through openings 59, and fixedly connected to an annular threaded drive screw 82 threadably engaging an annular collar 83 supported slidably but nonrotatably within the secondary housing 50 and supporting an antifriction bearing assembly 84 in turn rotatably supporting an annular coupling 86 fixedly connected to a second helical cam 91 mounted slidably but nonrotatably within the primary housing 30.

Notwithstanding the fact the cams 71 and 91 and the cam followers 46 are described above and illustrated in the drawings as worms and segments of worm wheels, they may instead comprise any equivalent combination of a relatively nonrotatable cam movable lengthwise of a given axis and a cam follower rotatable in a plane perpendicular to the given axis, but immovable lengthwise of the given axis, such as a worm and a segment of an enveloping worm wheel or other compatible configuration of the cam follower, or a multiple threaded screw and a nut, or half nut or rack segment.

The embodiment of this invention described above and illustrated in the accompanying drawings, so arranged as to be particularly well suited to manual operation of the control knobs 61 and 81, is also readily adaptable to operation from a remote station, either manually or otherwise, if necessary.

The balancing device described and illustrated here is used most effectively in conjunction with suitable means for detecting the magnitude of vibrations caused by an unbalanced condition of an operatively associated grinding wheel or other rotating element, for example, the vibratory reed 48 incorporated in the vibration indicator 47 described and illustrated in U.S. Pat. No. 2,164,900, the vibratory reed 102 incorporated in the indicator 101 described and illustrated in U.S. Pat. 2,241,637, a vibration sensitive device mounted as indicated in FIG. 5 of U.S. Pat. 3,107,459 or any other vibration indicator suitable for this use, selected or adapted from among such units commercially available.

Referring particularly to the embodiment of this balancing device described and illustrated here, the primary housing 30, the cams 71 and 91, and the eccentric balancing members 43 are normally rotated with the primary housing 30 in fixed angular relation to the associated grinding wheel, while the secondary housing 50 restrained as described and the control means including knobs 61 and 81 are normally maintained nonrotatable.

Whenever an unbalanced condition of the associated grinding wheel is indicated by a suitable vibration indicating means or otherwise, the respective knobs are selectively rotated in one direction or the other to produce axial displacement of the respective helical cams 71 and 91 in the direction and by the amount necessary to adjust the angular positions of the respective balancing members 43, each within a full 360° range, either so as to achieve or so as to restore a fully balanced condition of the grinding wheel mounted and secured in its normal operative relation to a supporting wheel spindle assembly and rotating at its normal operating speed.

Thus, the balancing apparatus described herein features a compact design of relatively small dimensions both axially and radially of an associated rotating element and incorporates a series of concentric symmetrical cylindrical parts, substantially all of which are, by their configuration, inherently balanced about the axis of rotation, avoiding any requirement for additional dead weight useful only to balance the various components of this balancing apparatus other than the eccentrically weighted balancing members. Moreover, the configuration of the balancing members concentrates the eccentrically disposed weighted portions adjacent their peripheries and along only one side thereof, so as to maximize the balancing effect of the eccentrically located weighted portions throughout a full 360° range of operation, at the same time minimizing the amount of eccentrically located weight required for a given balancing capability. Additionally, the provision of control means independently operable selectively to displace the respective balancing members angularly 360° obviates any additional requirement for means of controlling the respective balancing weights collectively, another saving of space and weight in this balancing apparatus. Furthermore, the provision of externally accessible controls normally at rest while the associated rotating element is in motion, and selectively manually operable, both facilitates and assures the success of required balancing operations preformed using this apparatus by an operator neither highly skilled nor especially trained to perform this operation.

What I claim is:

1. For use with an element mounted for rotation about a given fixed predetermined axis, a manually adjustable balancing apparatus comprising:

a hollow cylindrical primary housing with an open outer end and a closed inner end at which it is fixedly secured relative to and rotatable with such an element about its given predetermined axis of rotation;

first and second eccentric balancing weights mounted rotatably within said primary housing for rotation therewith in fixed angular and axial relation thereto and selectively rotatable about the given predetermined axis angularly relative to said primary housing;

a hollow cylindrical secondary housing rotatably supported concentrically of said primary housing and projecting lengthwise of the given predetermined axis beyond the outer end of said primary housing;

restraining means connected to said secondary housing and operative to maintain said secondary housing nonrotatable about the given predetermined axis;

first control means rotatably mounted concentrically of said secondary housing and selectively manually rotatable about the given predetermined axis relative to said secondary housing;

second control means rotatably mounted concentrically of said secondary housing and selectively manually rotatable about the given predetermined axis relative to said secondary housing;

first and second cam follower means respectively fixedly connected to said first and second eccentric balancing weights;

first cam means mounted concentrically of and nonrotatable relative to said primary housing and movable axially of said primary housing in engagement with said first cam follower means to effect rotation of said first eccentric balancing weight relative to said primary housing;

second cam means mounted concentrically of and nonrotatable relative to said primary housing and movable axially of said primary housing in engagement with said second cam follower means to effect rotation of said second eccentric balancing weight relative to said primary housing;

first actuating means interconnecting said first control means and said first cam means and operative to produce axial movement of said first cam means in response to rotation of said first control means; and second actuating means interconnecting said second control means and said second cam means and operative to produce axial movement of said second cam means in response to rotation of said second control means:

whereby an element rotating about the given fixed predetermined axis may be balanced by selective manual rotation of said first control means and said second control means relative to said nonrotating secondary housing means to displace said first and second eccentric balancing weights rotating with said primary housing angularly relative to said rotating primary housing.

2. A device as described in claim 1, wherein:

said first control means rotatable relative to said secondary housing is operative to produce axial displacement of said first cam means in operative engagement with said first cam follower sufficient to rotate said first eccentric balancing weight 360° relative to said primary housing; and said second control means rotatable relative to said secondary housing is operative to produce axial displacement of said second cam means in engagement with said second cam follower sufficient to rotate said second eccentric balancing weight 360° relative to said primary housing.

3. A device as described in claim 2, wherein each of said first and second eccentric balancing weights includes:

a relatively light annular central supporting portion rotatably supported concentrically of said primary housing, and a single relatively heavy semicircular peripheral weighted portion fixedly interconnected by a radial connecting portion.

4. A device as described in claim 2, wherein each of said first and said second actuating means includes:

a first member movable axially of and nonrotatably relative to said secondary housing responsive to rotation of one of said control means;

a second member movable axially of and nonrotatable relative to said primary housing and fixedly connected to one of said cam means; and a rotatable coupling operatively interconnecting said first member and said second member;

whereby axial displacement of said first member responsive to rotation of one of said control means produces corresponding axial displacement of one of said cam means.

5. For use in operative association with a given element fixedly secured to and rotating with a given spindle about a given axis, a balancing apparatus comprising:

a first annular supporting portion arranged to be mounted concentrically of and in fixed angular relation to the given element rotating about the given axis;

a bearing means mounted concentrically of the given predetermined axis upon an annular flange extending inwardly from said first annular supporting portion;

first and second eccentrically weighted balancing means mounted upon said bearing means and respectively contiguous to the opposite sides of said annular flange within said first supporting portion rotatably relative to said first supporting portion about the given axis and normally maintained in fixed angular relation to said first supporting portion;

a second supporting portion mounted concentrically of the given spindle and rotatably relative to the given spindle about the given axis;

means maintaining said second supporting portion nonrotatable about the given axis;

first and second control means mounted upon said second supporting portion rotatably relative to said second supporting portion concentrically about the given axis and normally nonrotating about the given axis; and first and second actuating means independently operatively interconnecting said first control means and said first balancing means, and said second control means and said second balancing means, respectively;

whereby said first control means and said second control means may be independently rotated selectively to produce independent displacement of said first and said second eccentrically weighted balancing means angularly relative to said supporting portion, so as to balance the given element and the given spindle rotating about the given axis.

6. For use in operative association with a given element fixedly secured to a given spindle rotatably mounted in a given support and rotating about a given fixed predetermined axis, an adjustable balancing apparatus for the given element comprising:

a hollow first housing fixedly secured concentrically relative to and rotating with the given element about its given predetermined axis of rotation;

an inwardly extending annular flange with opposite side faces fixedly secured internally of said first housing;

balance weight supporting means mounted centrally of and upon said annular flange;

first and second eccentric balancing weights supported upon said supporting means and respectively closely adjacent to the opposite sides of said annular flange within said first housing for rotation therewith in fixed angular relation thereto and selectively rotatable about the given predetermined axis angularly relative to said first housing;

a hollow second housing rotatably supported concentrically of the given predetermined axis;

restraining means connected to said second housing and operative to maintain said second housing nonrotatable about the given predetermined axis;

first control means mounted concentrically and rotatably within and operable from without said second housing and selectively rotatable relative to said second housing about the given predetermined axis;

second control means mounted concentrically and rotatably within and operable from without said second housing and selectively rotatable relative to said second housing about the given predetermined axis;

first and second cam follower means respectively fixedly connected to said first and second eccentric balancing weights;

first cam means mounted nonrotatably relative to said first housing and movable axially relative to said first housing in engagement with said first cam follower means to effect rotation of said first eccentric balancing weight relative to said first housing;

second cam means mounted within and nonrotatably relative to said first housing and movable axially relative to said first housing in engagement with said second cam follower means to effect rotation of said second eccentric balancing weight relative to said first housing;

first actuating means interconnecting said first control means and said first cam means and operative to produce axial movement of said first cam means in response to rotation of said first control means; and second actuating means interconnecting said second control means and said second cam means and operative to produce axial movement of said second cam means in response to rotation of said second control means;

whereby the given element rotating about the given fixed predetermined axis may be balanced by selective rotation of said first control means and said second control means relative to said nonrotating second housing to displace said first and second eccentric balancing weights rotating with said first housing angularly relative to said rotating first housing.

7. A device as described in claim 6, wherein each of said first and second eccentric balancing weights includes:

a relatively light annular supporting portion rotatably mounted within said primary housing, and a single relatively heavy semicircular peripheral weighted portion fixedly interconnected by a radial connecting portion.